(12) United States Patent
Koike et al.

(10) Patent No.: US 7,438,545 B2
(45) Date of Patent: Oct. 21, 2008

(54) COTTON CANDY MACHINE

(75) Inventors: Fuji Koike, Aichi (JP); Yoshiyuki Hayashi, Aichi (JP)

(73) Assignee: Royal Industries Co., Ltd., Aichi (JP)

( * ) Notice: Subject to any disclaimer, the term of this patent is extended or adjusted under 35 U.S.C. 154(b) by 0 days.

(21) Appl. No.: 11/497,108

(22) Filed: Jul. 31, 2006

(65) Prior Publication Data
US 2007/0031527 A1    Feb. 8, 2007

(30) Foreign Application Priority Data
Aug. 2, 2005    (JP) .............................. 2005-224129

(51) Int. Cl.
*B22D 11/01* (2006.01)
*B28B 1/00* (2006.01)

(52) U.S. Cl. ............................ 425/9; 425/8; 425/190; 425/192 R

(58) Field of Classification Search ............... 425/9, 425/6, 8, 190, 192 S, 192 R
See application file for complete search history.

(56) References Cited

U.S. PATENT DOCUMENTS 4,846,643 A * 7/1989 Yamamoto et al. ............. 425/7

6,722,869 B2 * 4/2004 Todokoro ...................... 425/9

FOREIGN PATENT DOCUMENTS

JP    2003-333994    * 11/2003

* cited by examiner

*Primary Examiner*—Philip C Tucker
*Assistant Examiner*—Dimple N Bodawala
(74) *Attorney, Agent, or Firm*—Cooper & Dunham LLP

(57) ABSTRACT

To provide a cotton candy machine that is useful especially when using candy balls as a cotton candy material.

A horizontal pedestal 28 is disposed at the upper end 11a of a rotary shaft 11. Threaded levers 30 are provided on the horizontal pedestal 28 eccentrically from the axis of the rotary shaft 11. The threaded levers 30 are passed through respective engagement holes 25a, 36a, 40a, 45a, 50a of a bobbin receiving pedestal 25, a bobbin 36, a melting plate 40, a lid member 45, and a protective cover member 50 so as to rigidly secure the bobbin receiving pedestal 25, the bobbin 36, the melting plate 40, the lid member 45, and the protective cover member 50 on top of each other.

5 Claims, 8 Drawing Sheets

COTTON CANDY MACHINE

FIELD OF THE INVENTION

The present invention relates to a cotton candy machine for making cotton candy.

BACKGROUND ART

Conventional cotton candy machines are designed to make cotton candy such that sugar is fed into a bottomed rotary pot, and the rotary pot is heated over a heater to melt the sugar and then rotated at high speeds so that the melted sugar can be forced out by centrifugal force through a gap in the rotary pot to form a strand of sugar referred to as floss (see Patent Document 1, for example). The structure of the cotton candy machine disclosed in Patent Document 1 is briefly described. The disclosed cotton candy machine includes a rotary pan 10 (rotary pot) into which sugar is fed, and a vertical stationary shaft 6 connected to a power unit 4 and extending in a vertical direction through a central part of the rotary pan 10. In such structure, as the vertical stationary shaft 6 is rotated at high speeds, the rotary pan 10 also rotates at high speeds.

There has been proposed another cotton candy machine designed to use ready-made candy balls as a cotton candy material (see Patent Document 2). Employment of such structure allows making cotton candy in various colors, flavors or tastes. Such structure also offers an advantage of easier handling of the material even by small children. The cotton candy machine disclosed in Patent Document 2 is adapted such that ready-made candy balls are fed into an oven (rotary pot) 35 through an opening 41, the candy balls are melted over an electric heater 50, and then the oven 35 is rotated at high speeds so as to force the melted candy balls through a gap "s" in the oven 35 to the outside. This cotton candy machine also has a rotary shaft 27 extending in a vertical direction through a central part of the oven 35.

[Patent Document 1]
  JP-A-2003-9773

[Patent Document 2]
  JP-A-2004-24021

DISCLOSURE OF THE INVENTION

Problem to be Solved by the Invention

The conventional cotton candy machines have the rotary shaft extending in the vertical direction through the central part of the rotary pot, as described above. In some machines, the rotary shaft is passed through the opening in the top face of the rotary pot through which candy balls are fed. Other machines have an attachment metal fitting disposed in an internal hollow section of the rotary pot for connection between the rotary pot and the rotary shaft. This comes from a function of the rotary shaft supporting the rotary pot as a support pillar. There arises a problem that the area of the opening through which candy balls are fed or the capacity of the rotary pot might be limited. Accordingly, specifically when using candy balls as a material, the candy balls must be broken into a required size or into pieces before being fed into the rotary pot. The use of candy balls as a material, therefore, necessarily involves troublesome preparation.

In view of the foregoing, it is, therefore, an object of the present invention to provide a cotton candy machine that is useful especially when using candy balls as a cotton candy material.

Means for Solving the Problem

The present invention is directed to a cotton candy machine including: a rotary shaft connected to a drive source and extending generally in a vertical direction; a pedestal rigidly secured to the upper end of the rotary shaft; a bottomed rotary pot disposed on the pedestal and having a candy ball feed opening that is open at the upper face of the rotary pot and an ejection gap that is open radially outward, the bottomed rotary pot receiving candy balls fed through the candy ball feed opening; a heater disposed directly below the bottomed rotary pot and on the pedestal for heating the bottomed rotary pot; and a bottomed rotary pot fixing means fixed on the pedestal for holding the peripheral portion of the bottomed rotary pot and fixing the rotary pot on the pedestal in position, in which the candy balls fed into the bottomed rotary pot through the candy ball feed opening are heated to melt by the heater, and the bottomed rotary pot is rotated about the rotary shaft so as to force the melted candy balls by centrifugal force through the ejection gap to the outside to form candy floss.

According to the invention having this constitution, since a heater is disposed directly below a bottomed rotary pot, and the rotary pot is fixed in position at its peripheral portion, a candy ball feed opening at the upper end is open without being obstructed. Also, no connection part of a rotary shaft and the bottomed rotary pot is located within the candy ball feed opening of the rotary pot or in the internal space defined by the rotary pot. This allows a user to feed a material through the candy ball feed opening easily, and the area of the candy ball feed opening or the size of the internal space cannot be limited by the rotary shaft, an attachment metal fitting, or the like.

The present invention is directed to the cotton candy machine in which the bottomed rotary pot fixing means removably holds the bottomed rotary pot.

According to the invention having this constitution, the bottomed rotary pot can be removed from the cotton candy machine to wash off candy or the like attached to the rotary pot.

The present invention is directed to the cotton candy machine further including a protective cover member attached on top of the bottomed rotary pot, the protective cover member including: a cylindrical cover body disposed on top of the bottomed rotary pot so as to surround the candy ball feed opening; a candy ball receiving case having a candy ball receiving opening and having an outside diameter slightly smaller than the diameter of a top opening of the cover body; a shaft portion disposed on the candy ball receiving case and having an axis extending in a direction generally perpendicular to the direction in which the candy ball receiving opening is open; and a bearing part disposed on the cover body for journaling the shaft portion of the candy ball receiving case such that the candy ball receiving case is located within the top opening of the cover body, in which as the shaft portion is rotated about the axis thereof, the candy ball receiving case rotates within the top opening about the shaft portion to selectively change between a candy ball receiving mode where the candy ball receiving opening is directed upward in the vertical direction and a candy ball feeding mode where the candy ball receiving opening is directed downward in the vertical direction to face the candy ball feed opening of the rotary pot.

In the invention having this constitution, when candy balls are fed into the bottomed rotary pot, a candy ball receiving opening of the protective cover member is first changed to a candy ball receiving mode. In other words, the shaft portion is rotated by a required angle to direct the candy ball receiving opening upward in the vertical direction. Then, candy balls are fed through the candy ball receiving opening into a candy ball receiving case from above. Then, the shaft portion is rotated to turn over the candy ball receiving case holding the candy balls so as to change the candy ball receiving opening to a candy ball feeding mode. In other words, the candy ball receiving opening is directed downward in the vertical direction. Then, the candy balls in the candy ball receiving case will fall down through the candy ball receiving opening. Since the candy ball receiving case is located above the candy ball feed opening of the bottomed rotary pot, the candy balls falling down from the candy ball receiving case passes through the candy ball feed opening into the bottomed rotary pot. It is understood that when powdery sugar is used as a cotton candy material, the sugar is fed into the bottomed rotary pot using the candy ball receiving case in the same manner. In addition, the candy ball receiving case according to the present invention can be used as a measuring cup, thereby using its volume as a reference. This makes it possible for the user to feed the invariable right amount of material into the bottomed rotary pot all the time. Further, the protective cover member has a cover body surrounding the candy ball feed opening, and the candy ball receiving case has an outside diameter slightly smaller than the diameter of the top opening of the cover body. This makes it significantly difficult for the user, especially a small child, to reach the bottomed rotary pot from outside. It is thus possible to prevent children to accidentally touch the hot bottomed rotary pot by their hands.

The present invention is directed to the cotton candy machine in which the rotary pot includes a melting plate on which the candy balls are placed, and a lid member having the candy ball feed opening that is open at the upper face thereof, the lid member being mounted on the melting plate so as to define the ejection gap therebetween, in which the cover body of the protective cover member is mounted on top of the lid member and has an upper edge projecting upward, and in which the rotary pot fixing means is an elongated member that is tiltable relative to the pedestal and has a lower end pivotally supported on the pedestal and an upper end with an engagement projection to engage with the upper edge of the cover body, the elongated member being selectively moved between a raised and fixed position where the engagement projection is in engagement with the upper edge of the cover body, with the melting plate, the lid member, and the protective cover member pressed against the pedestal, and an expanded position where the elongated member is tiled radially outward to bring the engagement projection out of engagement with the upper edge of the cover body.

According to the invention having this constitution, a plurality of components are mounted on the pedestal, which is rigidly secured to the upper end of the rotary shaft, on top of each other in a packaged fashion, thereby facilitating removal of the melting plate, the lid member, and the protective cover body from the rotary shaft. This makes it easier to perform maintenance to the cotton candy machine, especially to remove the component with candy for washing.

EFFECT OF THE INVENTION

In a cotton candy machine according to the present invention, a heater is disposed directly below a bottomed rotary pot, and a bottomed rotary pot fixing means is provided for holding the peripheral portion of the bottomed rotary pot and fixing the rotary pot on a pedestal in position. Therefore, a candy ball feed opening at the upper end is open without being obstructed. Also, no connection part of a rotary shaft and the bottomed rotary pot is located within the candy ball feed opening of the rotary pot or in the internal space defined by the rotary pot. Accordingly, the area of the feed opening or the size of the internal space cannot be limited by the rotary shaft, an attachment metal fitting, or the like. According to the present invention, therefore, candy balls, for example, as a material need not be broken into pieces beforehand, thereby providing significantly improved workability, and ultimately, allowing easy handling by small children, for example.

When the bottomed rotary pot fixing means is adapted to removably hold the bottomed rotary pot, the rotary pot can be removed from the cotton candy machine to wash off candy or the like attached to the rotary pot, providing an advantage that the cotton candy machine can be kept clean.

When the cotton candy machine has a protective cover member with a candy ball receiving case, which is rotated within the top opening of the protective cover member to selectively change a candy ball receiving opening between a candy ball receiving mode and a candy ball feeding mode, the candy ball receiving case can be used as a measuring cup. Also, it is difficult for a user to reach the bottomed rotary pot from outside, thereby preventing children to accidentally touch the hot rotary pot by their hands.

When the cotton candy machine has an elongated member with an engagement projection to engage with the upper edge of a cover body while a melting plate, a lid member, and the protective cover member are pressed against the pedestal, it is possible to remove the melting plate, the lid member and the protective cover member from the rotary shaft. Thus, the components with candy can be easily removed and washed.

BEST MODE FOR CARRYING OUT THE INVENTION

First Embodiment

A cotton candy machine 1 in accordance with an embodiment of the present invention is described below with reference to the attached drawings.

As shown in FIGS. 1 and 2, a cotton candy machine 1 includes a base 2 and an annular tray 4. The base 2 has the central portion in which a cotton candy making section 10 is disposed. The tray 4 is attached on top of the base 2 so as to surround the cotton candy making section 10. In such structure, floss is made to spread to the outside from the cotton candy making section 10, and then collected on a stick or the like in the tray 4.

The base 2 has a support portion 6 connected to the left side thereof and containing a hinge member 3. The hinge member 3 is connected to a disk-shaped cover 5. The hinge member 3 permits pivotal movement of the cover 5 between its substantially horizontal position (see FIG. 1) and its substantially vertical position (see FIG. 2). The cotton candy machine 1 is thereby brought to a closed state (see FIG. 1) where the inside of the tray 4 is inaccessible or to an open state (see FIG. 2) where the inside of the tray 4 is accessible.

The base 2 also has a power switch 70 on the upper face thereof. There is also provided a temperature adjusting dial 71 for adjustment to a predetermined temperature of a melting plate 40 to be described below.

The cotton candy making section 10 is discussed next.

As shown in FIGS. 3 and 4, the base 2 has the inner bottom face on which a support pedestal 20 with a horizontal support surface is rigidly secured. The support pedestal 20 has a motor 14 as a drive source mounted thereon. The motor 14 is housed in a fixed casing 14a, which is rigidly secured on the support pedestal 20.

The motor 14 has a driveshaft to which a first gear 13a is connected. The first gear 13a is in meshing engagement with a second gear 13b that is connected to the lower end 11b of a vertically extending rotary shaft 11. In such structure, as the motor 14 is driven, the power is transmitted via the gears 13a, 13b to the rotary shaft 11, causing the shaft to rotate about its own axis at high speeds. The rotary shaft 11 is journaled on a bearing portion 19 defined by a thrust bearing and extends in a vertical direction. The motor 14 used can be any suitable motor known in the art.

The support pedestal 20 has a plurality of support pillars 18 thereon. The support pillars 18 have the upper ends on which a disk-shaped table 12 is disposed. A slip ring 15 is attached to the central portion of the table 12. In such structure, the rotary shaft 11 is passed through a central part of the table 12, and fixed to the slip ring 15 into one body by means of a fixing member 11c.

The slip ring 15 includes an anode portion 15a and a cathode portion 15b surrounding the rotary shaft 11. The anode portion 15a on the upper side is connected to an anode brush 16a that is bent into an L shape. The cathode portion 15b on the lower side is connected to a cathode brush 16b. The anode brush 16a is attached on top of a brush support platform 17 for adjustment to the vertical position thereof. The slip ring 15 is connected to an electrically heated wire 26 to be described below.

The rotary shaft 11 extending through the slip ring 15 has the upper end 11a rigidly secured to a horizontal pedestal 28 that is defined by a thin circular plate. The horizontal pedestal 28 at its peripheral portion has three externally threaded levers 30 having a required height and equally spaced apart from each other. In other words, the threaded levers 30 are provided eccentrically from the axis of the rotary shaft 11. The horizontal pedestal 28 defines a pedestal according to the present invention.

The horizontal pedestal 28 also has two electrically heated wire communicating sections 27 of a rectangular shape at an area inside of the threaded levers 30. The electrically heated wire communicating sections 27 serve to connect the electrically heated wire 26, connected to the slip ring 15, to a bobbin 36 to be described below that is held above the horizontal pedestal 28.

Description is next made of components that are mounted on the horizontal pedestal 28 on top of each other. The components include a bobbin receiving pedestal 25, a bobbin 36, a melting plate 40, a lid member 45, and a protective cover member 50 as shown in FIGS. 4 through 6. These components are individually explained hereinafter.

The bobbin receiving pedestal 25 is in an annular shape with a center opening, and has a step 25c on its inner peripheral face. The inner peripheral face of the step 25c is provided with three engagement holes 25a extending therethrough in the vertical direction and equally spaced apart from each other. The bobbin receiving pedestal 25 at its upper end has a flange portion 24 extending radially outward by a certain length. The flange portion 24 serves to rectify airflow around the melting plate 40 to be described below. The bobbin receiving pedestal 25 is mounted on the horizontal pedestal 28 in position with the threaded levers 30 passed through the respective engagement holes 25a.

As shown in FIG. 5, the annular bobbin 36 is placed in the central portion and on the step 25c of the bobbin receiving pedestal 25. The bobbin 36 is described in further detail. The bobbin 36 at its outer peripheral face has a plurality of notches 37 extending in the vertical direction and having a certain depth. The electrically heated wire 26 is caught in the notches 37 and wound around the bobbin 36 in the radial direction.

The bobbin 36 has three engagement holes 36a extending therethrough in the vertical direction and equally spaced apart from each other around its periphery. The bobbin 36 is mounted on the bobbin receiving pedestal 25 in position, with the threaded levers 30 passed through the respective engagement holes 36a.

On the respective engagement holes 36a of the bobbin 36, tubular fixing members 38 are attached with the respective threaded levers 30 inserted therethrough. To be more specific, each fixing member 38 has an internal thread to mate with the threaded lever 30. As the internal threads of the fixing members 38 mate with the threaded levers 30, the bobbin receiving pedestal 25 and the bobbin 36 are fixed on the horizontal pedestal 28.

The melting plate 40 is mounted on top of the fixing members 38. The melting plate 40 is described in further detail. The melting plate 40 has the central portion that is slightly recessed and bottomed. On this recessed portion, candy balls or the like as a cotton candy material are placed. The melting plate 40 has a flange portion 41 defining the edge thereof. The flange portion 41 has three engagement holes 40a equally spaced apart from each other around its periphery. The melting plate 40 is disposed on the bobbin 36, with the threaded levers 30 passed through the respective engagement holes 40a. On the contrary, the melting plate 40 can be withdrawn from the threaded levers 30 by bringing the engagement holes 40a out of engagement with the threaded levers 30. In such structure, the melting plate 40 can be removably held on the threaded levers 30 and positioned on the horizontal pedestal 28. Further, since the melting plate 40 is located directly above the bobbin 36, the melting plate 40 is heated to a predetermined temperature over the electrically heated wire 26 wound around the bobbin 36. The electrically heated wire 26 defines a heater according to the present invention.

As shown in FIG. 6, on the melting plate 40, the lid member 45 is attached having a candy ball feed opening 48 extending therethrough in the vertical direction. The lid member 45 is described in further detail. The lid member 45 has a hat shape and includes a circular cylindrical portion 47 having the candy ball feed opening 48 at its upper end, and a flange portion 46 formed at the lower end of the circular cylindrical portion 47. The flange portion 46 has three engagement holes 45a equally spaced apart from each other around its periphery. The lid member 45 is mounted on the melting plate 40, with the threaded levers 30 passed through the respective engagement holes 45a. On the other hand, bringing the engagement holes 45a out of engagement with the threaded levers 30 permits withdrawal of the lid member 45 from the threaded levers 30. It should be noted that the lid member 45 is mounted and fixed on the melting plate 40, with an ejection gap "d" (see FIG. 3) defined between the lid member 45 and the melting plate 40. More specifically, the melting plate 40 at parts around the engagement holes 40a has a thickness slightly larger than the other parts so as to serve as spacers. Thus, when the flange portion 41 of the melting pate 40 and the flange portion 46 of the lid member 45 are disposed in overlapping relation to each other, a slight gap is formed therebetween defining the ejection gap "d" according to the present invention that is open radially outward. In addition, the melting plate 40 and the lid member 45 described above define a bottomed rotary pot according to the present invention.

On top of the lid member 45, the protective cover member 50 is attached. The protective cover member 50 is described in detail below.

The protective cover member 50 includes a cover body 51, bearing parts 52, a shaft portion 54, a cup 57, and a retention member 60. The cover body 51 has a cylindrical shape and is disposed on top of the lid member 45. The bearing parts 52 are disposed on the upper end face 51a of the cover body 51. The shaft portion 54 is journaled on the bearing parts 52. The cup 57 is connected to the shaft portion 54. The retention member 60 is designed to retain the shaft portion 54 from above.

The cover body 51 has an internal hollow section extending therethrough in the vertical direction. The cover body 51 at the central portion of its upper end face 51a has a circular top opening 53 in communication with the internal hollow section. The upper end face 51a has three engagement holes 50a equally spaced apart from each other around its periphery. The bearing parts 52 are disposed on opposite sides of the top opening 53. Specifically, bearing surfaces 52a, 52a defined by curved concave surfaces are formed on opposite sides of the top opening 53. The bearing surfaces 52a provide guiding operation, which causes the bearing parts 52 to journal the shaft portion 54 to be described below for rotation about its axis.

The cover body 51 is mounted on top of the lid member 45, with the threaded levers 30 passed through the respective engagement holes 50a. On the contrary, the cover body 51 can be withdrawn from the threaded levers 30 by bringing the engagement holes 50a out of engagement with the threaded levers 30.

The cover body 51 has the cup 57 attached thereto. The cup 57 is described in further detail. The cup 57 has a generally dome-shaped outline, and has a candy ball receiving opening 58 at its top face. The cup 57 has an outside diameter to be received within the top opening 53 of the cover body 51 described above. The cup 57 defines a candy ball receiving case according to the present invention.

The cup 57 has the circular cylindrical shaft portion 54 directly below the candy ball receiving opening 58. Specifically, the axis of the shaft portion 54 extends in a direction perpendicular to the direction in which the candy ball receiving opening 58 is open. The shaft portion 54 has the ends projecting from the cup 57 laterally outside. The ends of the shaft portion 54 are respectively provided with handles 55 having a diameter larger than the diameter of the shaft portion 54.

The shaft portion 54 is placed on the bearing parts 52 such that the cup 57 is received within the top opening 53. In such structure, as a user pinches and rotates the handles 55, the shaft portion 54 rotates about its axis while being subjected to the guiding operation of the bearing parts 52, causing the cup 57 to rotate. In such manner, the cup 57 is selectively changed between a state where the candy ball receiving opening 58 is directed upward in the vertical direction (hereinafter referred to as "candy ball receiving mode") and a state where the opening 58 is directed downward in the vertical direction (hereinafter referred to as "candy ball feeding mode").

The annular retention member 60 is disposed on top of the cup 57. The retention member 60 has an opening 61 extending therethrough in the vertical direction. The retention member 60 also has shaft retaining parts 62 that are curved so as to ride on the shaft portion 54 along the peripheral face thereof. The retention member 60 is fitted from above such that the axes of the shaft retaining parts 62 extend along the axes of the shaft portion 54 of the cup 57 and the bearing parts 52. In such structure, the shaft portion 54 is held between the shaft retaining parts 62 and the bearing parts 52, thereby preventing the shaft portion 54 from falling off during rotation and permitting smooth rotational operation.

The retention member 60 at its outer side face has three first screw thread parts 60a equally spaced apart from each other around its periphery and in which screws are inserted. The upper end face of the cover body 51 has three second screw thread parts 50b equally spaced apart from each other around its periphery and in which the screws are inserted. As the first screw thread parts 60a and the second screw thread parts 50b are attached to each other via the screws, the retention member 60 is fixed on the cover body 51 in position.

While the bobbin receiving pedestal 25, the bobbin 36, the melting plate 40, the lid member 45, and the protective cover member 50 are mounted on the horizontal pedestal 28 on top of each other, retaining members 67 are fitted on the respective upper ends of the threaded levers 30 such that those components are tightly secured to each other. The melting plate 40 and the like are thereby held at their peripheries and fixed on the horizontal pedestal 28 in position. It should be noted that a hexagonal wrench can be used to removably attach the retaining members 67 to the threaded levers 30. The threaded levers 30 and the retaining members 67 described above define a bottomed rotary pot fixing means according to the present invention.

Description is next made of a cotton candy making method using the cotton candy machine 1 constructed as described above.

First, the disk-shaped cover 5 is raised to bring the cotton candy machine 1 to an open state, where the inside of the tray 4 is accessible. The handles 55 are operated so as to rotate the cup 57 of the protective cover member 50 about the shaft portion 54 to a candy ball receiving mode.

Then, candy balls (or sugar) are fed into the cup 57 through the opening 61 and the candy ball receiving opening 58.

After the candy balls being fed into the cup 57, the handles 55 are operated so as to change the cup 57 to a candy ball feeding mode. The candy ball receiving opening 58 of the cup 57 is thus directed downward in the vertical direction. Therefore, the candy balls will fall down through the candy ball receiving opening 58, through the internal hollow section of the cover body 51 and through the candy ball feed opening 48 of the lid member 45 onto the melting plate 40. The candy balls are thus placed on the melting plate 40 through such feed path.

Then, the disk-shaped cover 5 is lowered to bring the cotton candy machine 1 to a closed state, and the power switch 70 is turned "on." When the power switch 70 is turned "on," the electrically heated wire 26 is heated to high temperatures so as to heat the melting plate 40 at a predetermined temperature. At the same time, the motor 14 is driven to rotate the melting plate 40 to about the rotary shaft 11. In addition, the heating temperature of the melting plate 40 can be adjusted if necessary by adjusting the temperature adjusting dial 71.

When the melting plate 40 has reached high temperatures and the candy balls have been melted, the melted candy are forced by centrifugal force produced by the rotation of the melting plate 40 through the ejection gap "d" into the tray 4. After a lapse of a predetermined period of time, the motor 14 and the like are stopped. The user then raises the disk-shaped cover 5 again to bring the cotton candy machine 1 to an open state and collects floss formed in the tray 4 on a stick or the like one after another. Cotton candy can be thereby obtained.

It should be noted that as described above, the melting plate 40, the lid member 45, and the protective cover member 50 can be removed from the cotton candy making section 10 by removing the retaining members 67. It is thus possible to wash those components at home easily after making cotton candy.

Second Embodiment

Description is made of a cotton candy making section 10*a* that has a construction different from the cotton candy making section discussed above. It should be understood that components common to the first and second embodiments are denoted by the same reference numerals, and description of such components is simplified or not repeated.

As shown in FIGS. 7 and 8, also in the second embodiment, a bobbin receiving pedestal 85, the bobbin 36, the melting plate 40, the lid member 45, and a protective cover member 95 are mounted on the horizontal pedestal 28. However, this embodiment is different from the first embodiment in the structure for fixing these components on the horizontal pedestal 28 in position. Such structure is described below.

As shown in FIG. 8, the bobbin receiving pedestal 85 is in an annular shape with a center opening, and has a step 90 on its inner peripheral face. The bobbin receiving pedestal 85 at its upper face 85*a* has three hook support parts 86 for pivotally supporting hooks 87 to be described below equally spaced apart from each other around its periphery. The lower face of the bobbin receiving pedestal 85 has projections 85*b* to be received in recesses 28*a* in the upper face of the horizontal pedestal 28. The bobbin receiving pedestal 85 is mounted on the horizontal pedestal 28 in position, with the projections 85*b* received in the respective recesses 28*a*. The horizontal pedestal 28 defines a pedestal according to the present invention.

Each hook support part 86 pivotally supports the hook 87. More specifically, as shown in FIG. 8, the hook 87 has the lower end with a shaft hole 87*a*, and the upper end with an engagement projection 87*b*. The shaft hole 87*a* is in engagement with the hook support part 86 in a manner permitting pivotal movement of the hook 87, and is located such that the distal end of the engagement projection 87*b* is directed to the center of rotation of the melting plate 40. The hook 87 is thus attached for tilting movement in a to-and-fro direction. Specifically, the hook 87 is selectively moved to a raised and fixed position where the hook 87 is raised into engagement with the upper edge 51*b* of the cover body 51 or an expanded position where the hook 87 is tiled radially outward to allow access to the cover body 51 and the like. The hooks 87 define an elongated member according to the present invention.

The bobbin 36 with the electrically heated wire 26 wound therearound is placed in the central portion 88 and on the step 90 of the bobbin receiving pedestal 85. On the bobbin 36, the tubular fixing members 38 are attached. The melting plate 40 is mounted on top of the fixing members 38. On the melting plate 40, the lid member 45 is attached. In addition, in this embodiment, the lower face of the flange portion 41 of the melting plate 40 is in contact with the upper face 85*a* of the bobbin receiving pedestal 85, thereby carrying the melting plate 40.

On top of the lid member 45, the protective cover member 95 is attached. The protective cover member 95 is described in further detail. As shown in FIGS. 7 and 8, the protective cover member 95 includes the cylindrical cover body 51, the bearing parts 52, the shaft portion (which is hidden and invisible), the cup 57, and the retention member 60. The cover body 51 is disposed on top of the lid member 45. The bearing parts 52 are disposed on the upper end face 51*a* of the cover body 51. The shaft portion 54 is journaled on the bearing parts 52. The cup 57 is connected to the shaft portion. The retention member 60 is designed to retain the shaft portion from above.

The cover body 51 in accordance with this embodiment has a flange portion 98 with cutouts 97 at is lower end. The flange portion 98 has the lower face in contact with the upper face of the flange portion 46 of the lid member 45. Within the space defined by each cutout 97, the hook support part 86 is disposed. The cover body 51 at its upper end has the upper edge 51*b* projecting upward and to which the engagement projections 87*b* of the hooks 87 are retained. The hooks 87 in accordance with this embodiment define a rotary pot fixing means according to the present invention.

In such structure, the melting plate 40 and the like are attached to the cotton candy making section 10*a* in the following order.

First, all the hooks 87 are tilted radially outward, and all the components described above are mounted on the horizontal pedestal 28 in order on top of each other. Then, those three hooks 87 tilted radially outward are raised, and the engagement projections 87*b* of the hooks 87 are press fitted on the upper edge 51*b* of the cover body 51 while the components are pressed down. More particularly, the hook 87 has an overall length extending to a position slightly below the upper edge 51*b* of the cover body 51 when the hook 87 is raised. Therefore, while the protective cover member 95 and the like are pressed down, when the engagement projection 87*b* is caught on the upper edge 51*b* against urging force of the protective cover member 95 and the like, the protective cover member 95 is held by the hook 87 into secure engagement with each other. On the other hand, the protective cover member 95 and the like are removed from the cotton candy making section 10*a* as follows. While those components are pressed down, the three hooks 87 are tilted radially outward to bring the hooks 87 out of engagement with the upper edge 51*b*.

The construction in accordance with the second embodiment provides the following advantage. If the melted candy forced out through the ejection gap "d" is attached to the hooks 87 and the like, resulting in the melting plate 40 and the hooks 87 stuck together through the candy, it is possible to separate each other easily just by tilting the hooks radially outward. The melting plate 40 and the like can thus be washed easily after making cotton candy.

It should be appreciated that the present invention may be embodied in various forms without departing from the spirit of the present invention.

DESCRIPTION OF REFERENCE NUMERALS AND SYMBOLS

Figure 1:
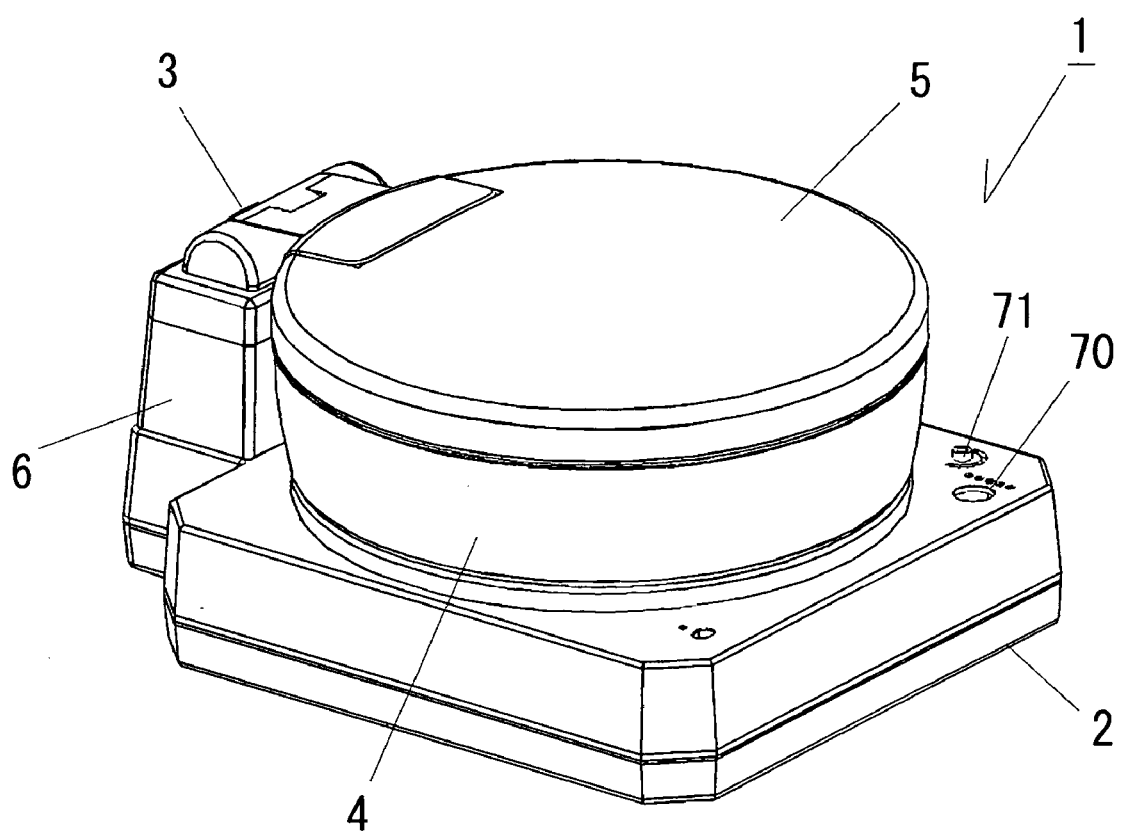
FIG. 1 is a perspective view of a cotton candy machine 1 in a closed state.
Figure 2:
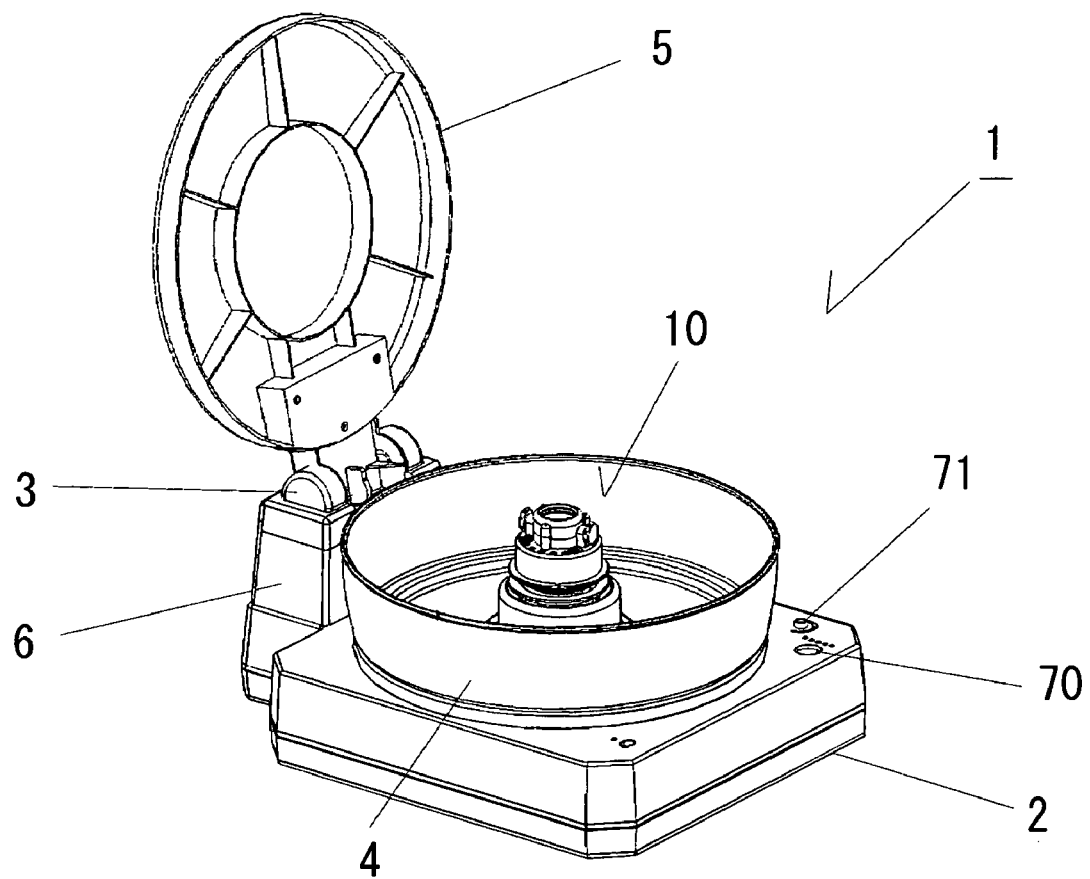
FIG. 2 is a perspective view of the cotton candy machine 1 in an open state.
Figure 3:
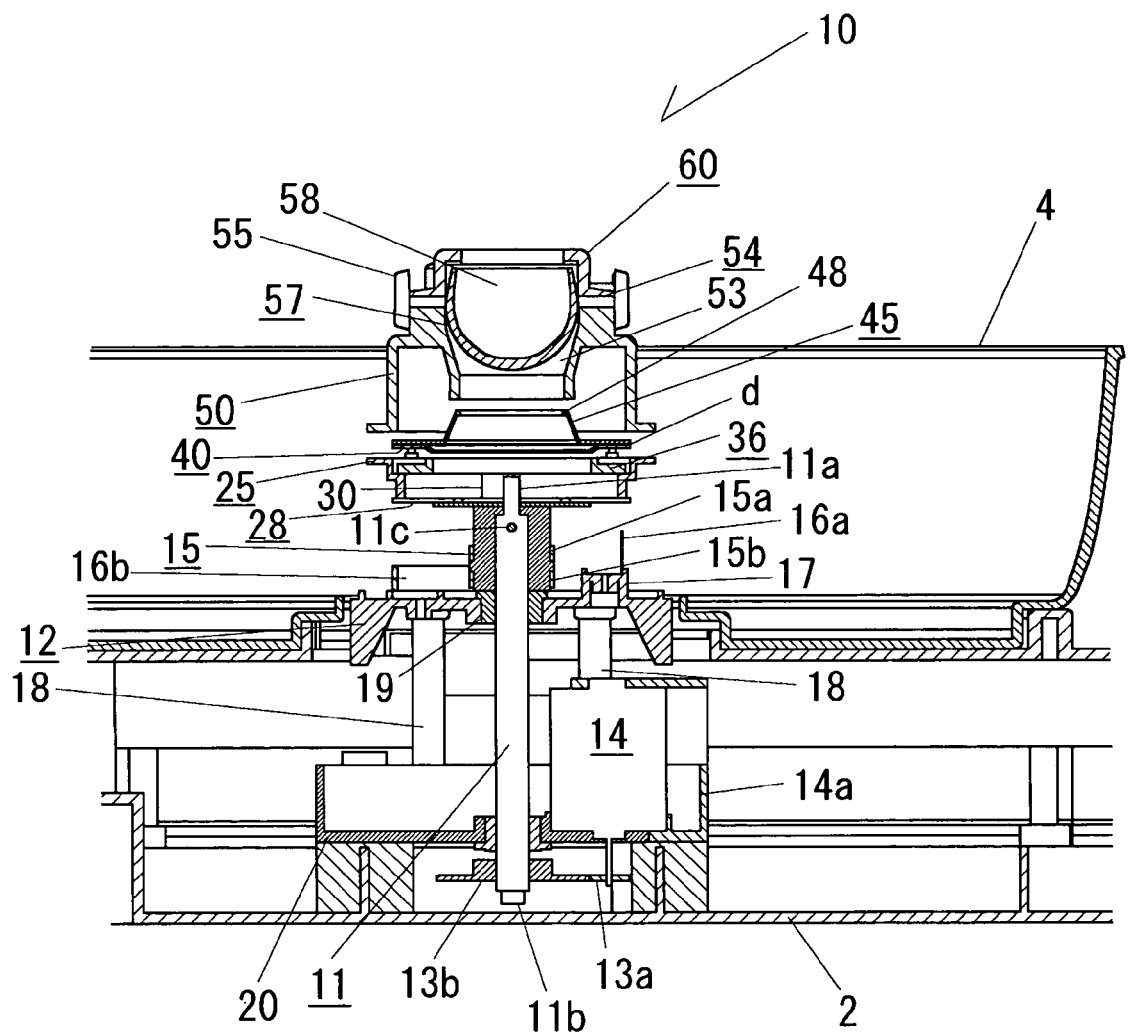
FIG. 3 is a vertical sectional side view of a cotton candy making section 10 in accordance with a first embodiment.
Figure 4:
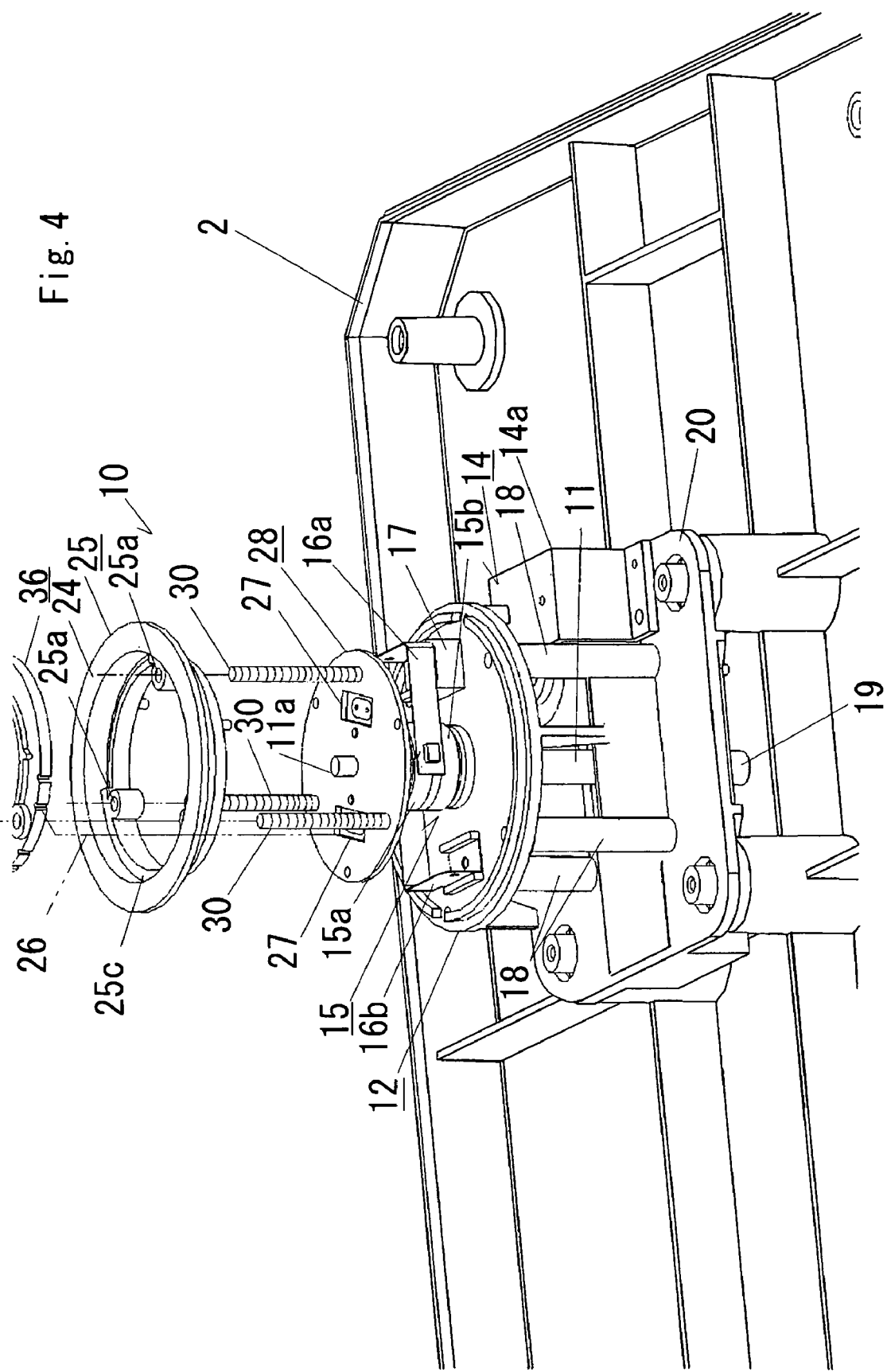
FIG. 4 is an exploded perspective view of a horizontal pedestal 28 and the like of the cotton candy making section 10 in accordance with the first embodiment.
Figure 5:
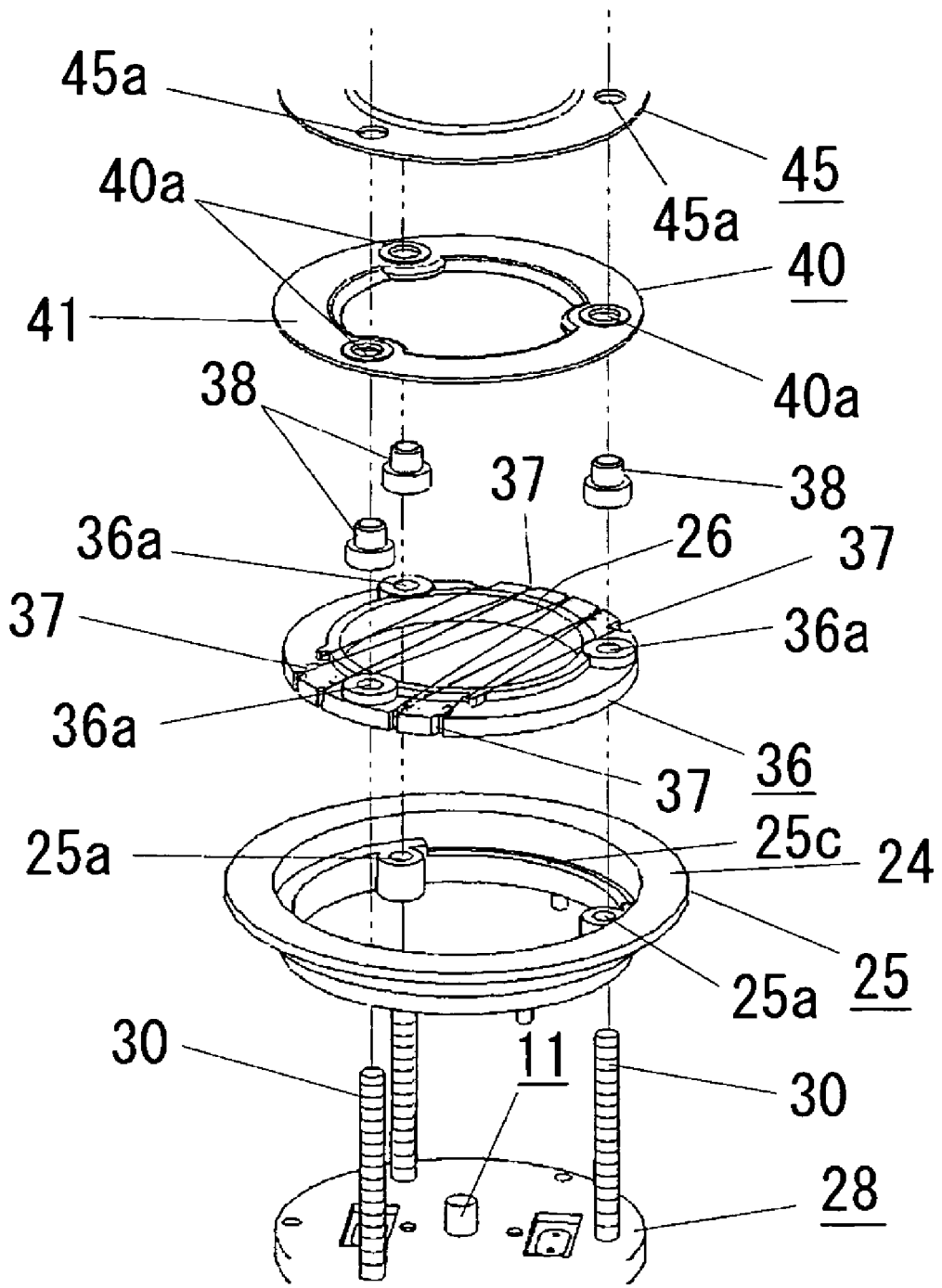
FIG. 5 is an exploded perspective view of a bobbin 36 and the like of the cotton candy making section 10 in accordance with the first embodiment.
Figure 6:
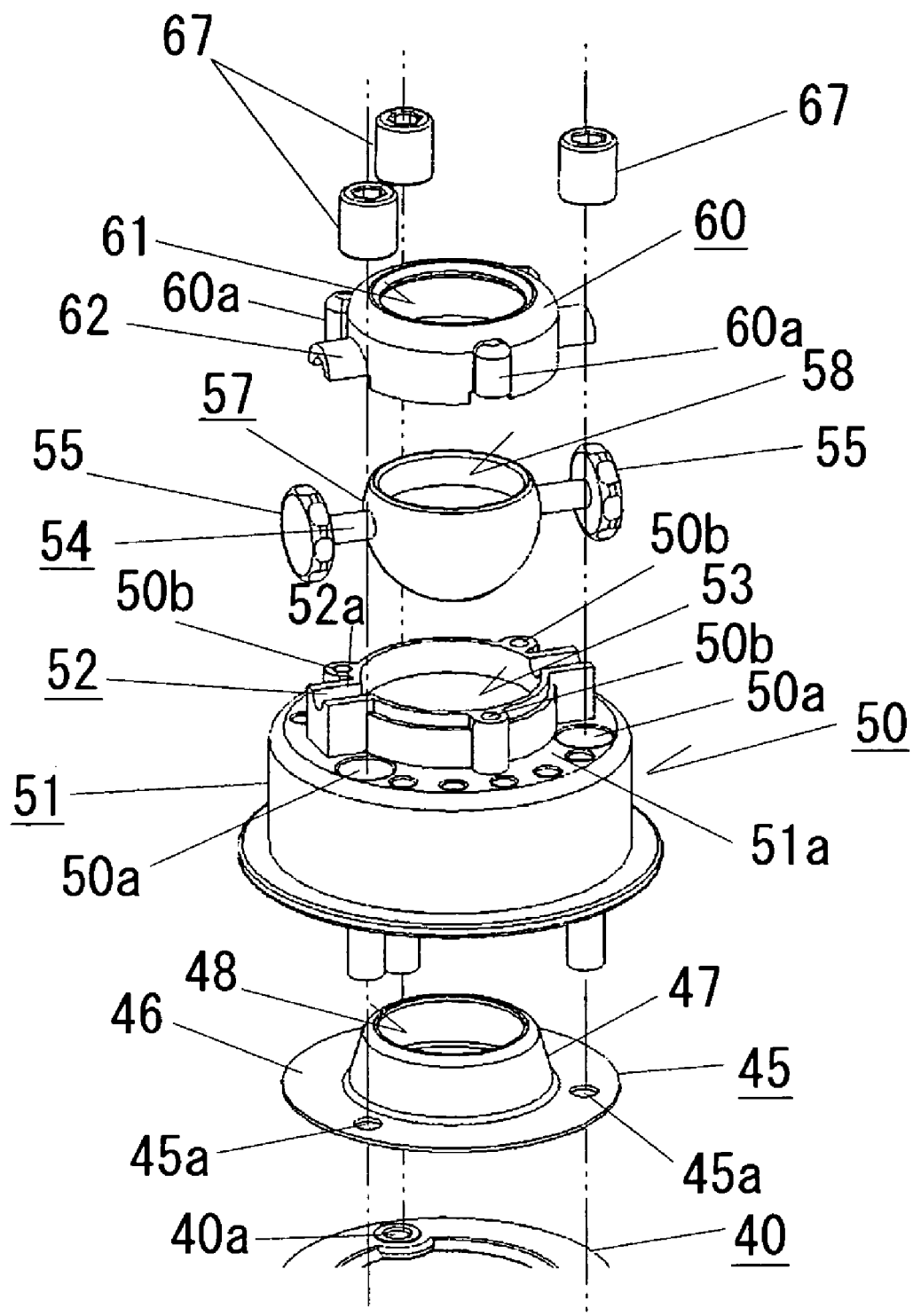
FIG. 6 is an exploded perspective view of a protective cover member 50 and the like of the cotton candy making section 10 in accordance with the first embodiment.
Figure 7:
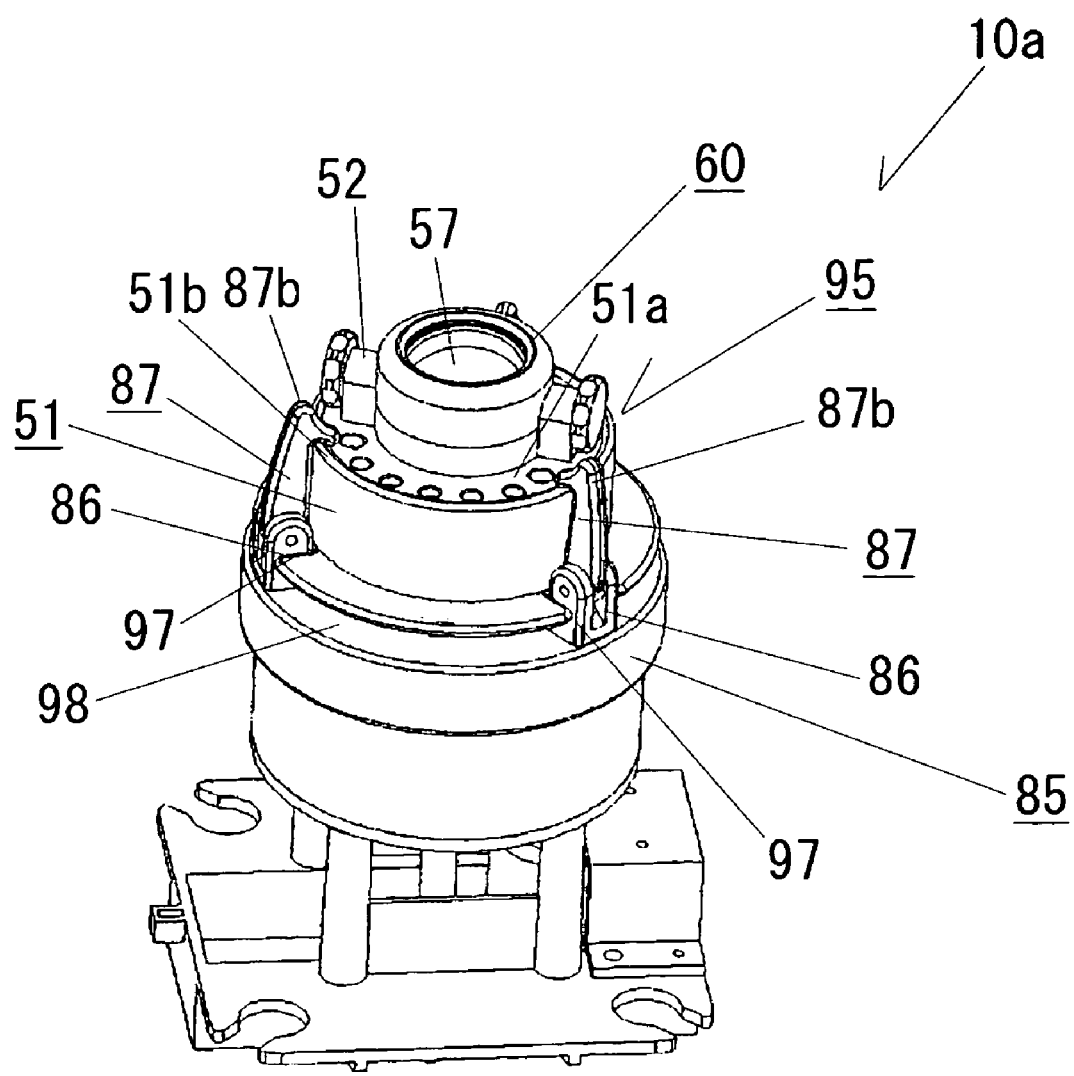
FIG. 7 is a perspective view of a cotton candy making section 10*a* in accordance with a second embodiment.
Figure 8:
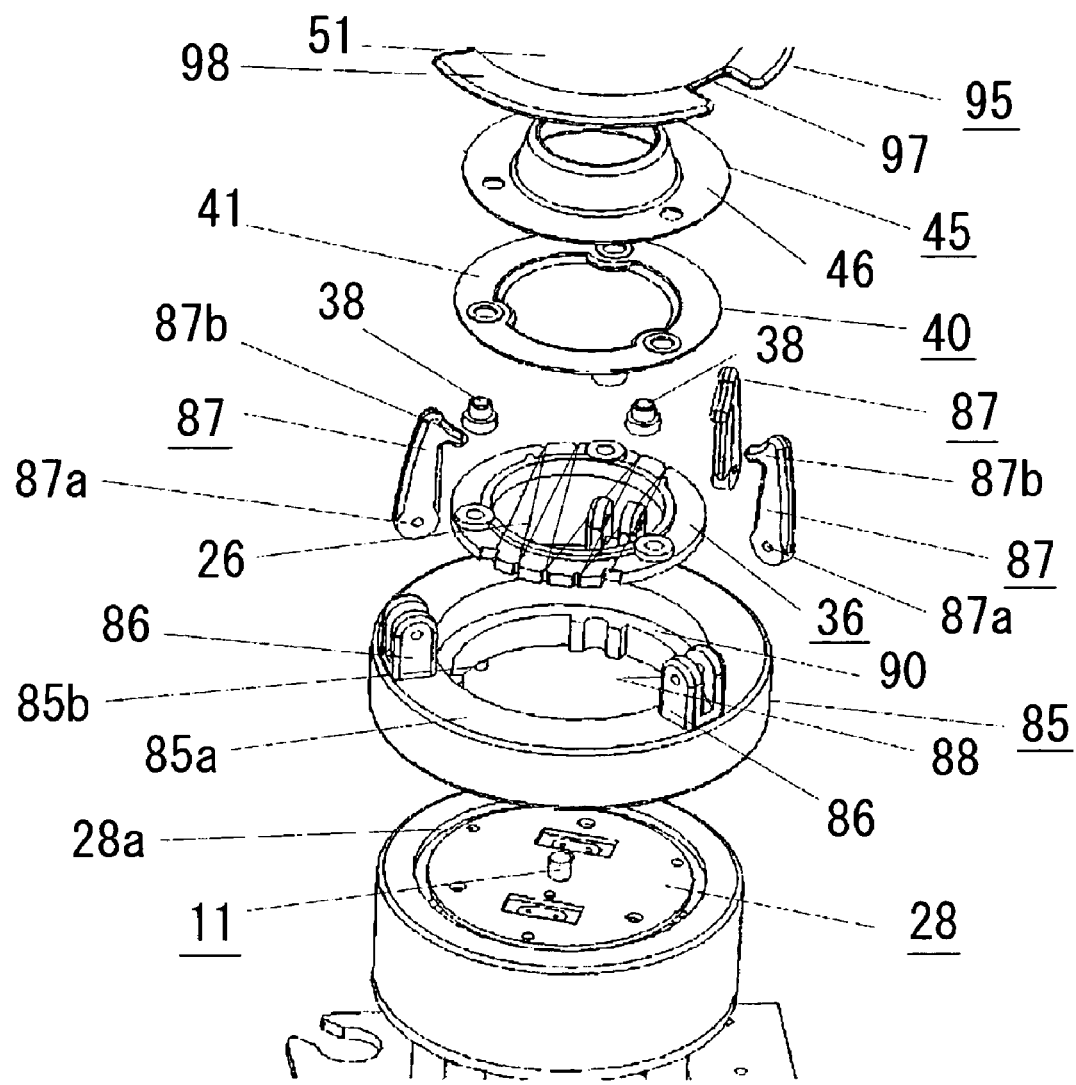
FIG. 8 is an exploded perspective view of a protective cover member 95 and the like of the cotton candy making section 10*a* in accordance with the second embodiment.

1: cotton candy machine
11: rotary shaft
14: motor
26: electrically heated wire
28: horizontal pedestal
30: threaded lever
40: melting plate
40a: engagement hole of melting plate
41: flange portion of melting plate
45: lid member
45a: engagement hole of lid member
46: flange portion of lid member
48: candy ball feed opening
50, 95: protective cover member
50a: engagement hole of cover body
51: cover body
51a: top opening
52: bearing part
54: shaft portion
57: cup
86: hook support part
87: hook
d: ejection gap

The invention claimed is:

1. A cotton candy machine comprising:
a rotary shaft connected to a drive source and extending generally in a vertical direction;
a pedestal directly secured to the upper end of the rotary shaft;
a bottomed rotary pot disposed on the pedestal;
a heater disposed directly below the bottomed rotary pot and on the pedestal for heating the bottomed rotary pot; and
a bottomed rotary pot fixing means to fix the bottomed rotary pot on the pedestal,
wherein the bottomed rotary pot comprises a melting plate and a hat shaped lid member having a candy ball feed opening on its upper face and a flange portion formed around the lower end of the lid member and the bottomed rotary pot fixing means removably holding the flange portion of the bottomed rotary pot and an ejection gap formed between the melting plate and the flange portion of the lid member and candy balls fed into the bottomed rotary pot through the candy ball feed opening are heated to melt on the melting plate by the heater, and the bottomed rotary pot is rotated about the rotary shaft with the pedestal so as to force the melted candy balls by centrifugal force through the ejection gap to the outside to form candy floss.

2. The cotton candy machine according to claim 1, further comprising a protective cover member attached on top of the bottomed rotary pot, the protective cover member including: a cylindrical cover body disposed on top of the bottomed rotary pot so as to surround the candy ball feed opening; a candy ball receiving case having a candy ball receiving opening and having an outside diameter slightly smaller than the diameter of a top opening of the cover body; a shaft portion disposed on the candy ball receiving case and having an axis extending in a direction generally perpendicular to the direction in which the candy ball receiving opening is open; and a bearing part disposed on the cover body for journaling the shaft portion of the candy ball receiving case such that the candy ball receiving case is located within the top opening of the cover body, wherein as the shaft portion is rotated about the axis thereof, the candy ball receiving case rotates within the top opening about the shaft portion to selectively change between a candy ball receiving mode where the candy ball receiving opening is directed upward in the vertical direction and a candy ball feeding mode where the candy ball receiving opening is directed downward in the vertical direction to face the candy ball feed opening of the rotary pot.

3. A cotton candy machine comprising:
a rotary shaft connected to a drive source and extending generally in a vertical direction;
a pedestal rigidly secured to the upper end of the rotary shaft;
a bottomed rotary pot disposed on the pedestal and having a candy ball feed opening that is open at the upper face of the rotary pot and an ejection gap that is open radially outward, the bottomed rotary pot receiving candy balls fed through the candy ball feed opening;
a heater disposed directly below the bottomed rotary pot and on the pedestal for heating the bottomed rotary pot;
a bottomed rotary pot fixing means provided on the pedestal for holding the peripheral portion of the bottomed rotary pot and fixing the rotary pot on the pedestal in position;
a protective cover member attached on top of the bottomed rotary pot, the protective cover member including:
a cylindrical cover body disposed on top of the bottomed rotary pot so as to surround the candy ball feed opening;
a candy ball receiving case having a candy ball receiving opening and having an outside diameter slightly smaller than the diameter of a top opening of the cover body;
a shaft portion disposed on the candy ball receiving case and having an axis extending in a direction generally perpendicular to the direction in which the candy ball receiving opening is open; and
a bearing part disposed on the cover body for journaling the shaft portion of the candy ball receiving case such that the candy ball receiving case is located within the top opening of the cover body,
wherein the candy balls fed into the bottomed rotary pot through the candy ball feed opening are heated to melt by the heater, and the bottomed rotary pot is rotated about the rotary shaft so as to force the melted candy balls by centrifugal force through the ejection gap to the outside to form candy floss, and
wherein as the shaft portion is rotated about the axis thereof, the candy ball receiving case rotates within the top opening about the shaft portion to selectively change between a candy ball receiving mode where the candy ball receiving opening is directed upward in the vertical direction and a candy ball feeding mode where the candy ball receiving opening is directed downward in the vertical direction to face the candy ball feed opening of the rotary pot.

4. The cotton candy machine according to claim 3, wherein die rotary pot includes a melting plate on which the candy balls are placed, and a lid member having the candy ball feed opening that is open at the upper face thereof, the lid member being mounted on the melting plate so as to define the ejection gap there between,
wherein the cover body of the protective cover member is mounted on top of the lid member and has an upper edge projecting upward, and
wherein the rotary pot fixing means is an elongated member that is tiltable relative to the pedestal and has a lower end pivotally supported on the pedestal and an upper end with an engagement projection to engage with the upper edge of the cover body, the elongated member being selectively moved between a raised and fixed position where the engagement projection is in engagement with the upper edge of the cover body, with the melting plate, the lid member, and the protective cover member pressed against the pedestal, and an expanded position where the elongated member is tilted radially outward to bring the engagement projection out of engagement with the upper edge of the cover body.

5. A cotton candy machine comprising:
- a rotary shaft connected to a drive source and extending generally in a vertical direction;
- a pedestal rigidly secured to the upper end of the rotary shaft;
- a bottomed rotary pot disposed on the pedestal and having a candy ball feed opening that is open at the upper face of the rotary pot and an ejection gap that is open radially outward, the bottomed rotary pot receiving candy balls fed through the candy ball feed opening;
- a heater disposed directly below the bottomed rotary pot and on the pedestal for heating the bottom rotary pot;
- a bottomed rotary pot fixing means provided on the pedestal for holding the peripheral portion of the bottomed rotary pot and fixing the rotary pot on the pedestal in position;
- a protective cover member attached on top of the bottomed rotary pot, the protective cover member including:
- a cylindrical cover body disposed on top of the bottomed rotary pot so as to surround the candy ball feed opening;
- a candy ball receiving case having a candy ball receiving opening and having an outside diameter slightly smaller than the diameter of a top opening of the cover body;
- a shaft portion disposed on the candy ball receiving case and having an axis extending in a direction generally perpendicular to the direction in which the candy ball receiving opening is open; and
- a bearing part disposed on the cover body for journaling the shaft portion of the candy ball receiving case such that the candy ball receiving case is located within the top opening of the cover body wherein the candy balls fed into the bottomed rotary pot through the candy ball feed opening are heated to melt by the heater, and the bottomed rotary pot is rotated about the rotary shaft so as to force the melted candy balls by centrifugal force through the ejection gap to the outside to form candy floss, wherein the bottomed rotary pot fixing means removably holds the bottomed rotary pot, and wherein as the shaft portion is rotated about the axis thereof, the candy ball receiving case rotates within the top opening about the shaft portion to selectively change between a candy ball receiving mode where the candy ball receiving opening is directed upward in the vertical direction anti a candy ball feeding mode where the candy ball receiving opening is directed downward in the vertical direction to face the candy ball feed opening of the rotary pot.

* * * * *